United States Patent
Chen et al.

(10) Patent No.: US 10,200,339 B2
(45) Date of Patent: Feb. 5, 2019

(54) PROVIDING A SERVICE TO A USER DEVICE BASED ON A CAPABILITY OF THE USER DEVICE WHEN THE USER DEVICE SHARES AN IDENTIFIER

(71) Applicant: Verizon Patent and Licensing Inc., Arlington, VA (US)

(72) Inventors: Xuming Chen, San Ramon, CA (US); Mingxing S. Li, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 193 days.

(21) Appl. No.: 14/816,274

(22) Filed: Aug. 3, 2015

(65) Prior Publication Data
US 2017/0041284 A1    Feb. 9, 2017

(51) Int. Cl.
*G06F 15/16* (2006.01)
*H04L 29/08* (2006.01)
*H04L 29/12* (2006.01)
*H04L 12/58* (2006.01)

(52) U.S. Cl.
CPC ........ *H04L 61/103* (2013.01); *H04L 61/1547* (2013.01); *H04L 67/24* (2013.01); *H04L 51/14* (2013.01); *H04L 67/303* (2013.01); *H04L 67/306* (2013.01)

(58) Field of Classification Search
CPC ..... H04L 12/58–12/5895; H04L 51/00–51/38; H04L 67/30–67/306; H04N 21/258–21/25891; H04W 4/12–4/14
See application file for complete search history.

(56) References Cited

U.S. PATENT DOCUMENTS

| | | | | |
|---|---|---|---|---|
| 7,136,635 B1 * | 11/2006 | Bharatia | ............. | H04L 65/1006 455/422.1 |
| 7,401,112 B1 * | 7/2008 | Matz | ..................... | G06F 9/5038 379/265.02 |
| 7,512,118 B1 * | 3/2009 | Stephens | ............. | H04L 65/1069 370/352 |
| 7,657,594 B2 * | 2/2010 | Banga | ............... | G06F 17/30867 709/203 |
| 8,126,439 B1 * | 2/2012 | Sankaranaraynan | ........................ | H04L 65/1069 455/414.1 |
| 8,364,123 B2 * | 1/2013 | Marcellino | ......... | H04W 36/385 455/3.01 |

(Continued)

*Primary Examiner* — David R Lazaro
*Assistant Examiner* — Julian Chang

(57) ABSTRACT

A device may receive, from multiple user devices associated with a shared identifier, registration information that includes a unique identifier for each user device of the multiple user devices, and capability information that identifies one or more capabilities of each user device. The device may store the registration information. The device may receive, from a service provider device, a query associated with providing a service, requiring a particular capability, to at least one of the user devices associated with the shared identifier. The query may include the shared identifier. The device may determine, based on the query and the stored registration information, a set of unique identifiers associated with the shared identifier, and may determine a set of capabilities corresponding to each unique identifier. The device may provide, to the service provider device, information that identifies the set of unique identifiers and the set of capabilities.

20 Claims, 6 Drawing Sheets

(56) References Cited

U.S. PATENT DOCUMENTS

| | | | |
|---|---|---|---|
| 8,780,703 B1* | 7/2014 | Eidelson | H04L 51/32 370/228 |
| 9,692,903 B2* | 6/2017 | Mandi | H04M 3/54 |
| 2003/0233461 A1* | 12/2003 | Mariblanca-Nieves | H04L 29/06 709/228 |
| 2004/0203664 A1* | 10/2004 | Lei | H04M 3/53 455/414.1 |
| 2005/0128997 A1* | 6/2005 | Zhao | H04L 67/24 370/349 |
| 2006/0029205 A1* | 2/2006 | Creamer | H04M 3/436 379/221.13 |
| 2006/0235994 A1* | 10/2006 | Wu | H04M 3/42374 709/238 |
| 2007/0127686 A1* | 6/2007 | Song | H04M 3/02 379/252 |
| 2007/0180123 A1* | 8/2007 | Bennett | H04M 3/42263 709/227 |
| 2007/0189276 A1* | 8/2007 | Bennett | H04L 12/66 370/356 |
| 2007/0223463 A1* | 9/2007 | Weinberger | H04L 51/36 370/356 |
| 2007/0274499 A1* | 11/2007 | Bennett | H04M 1/274525 379/220.01 |
| 2008/0010669 A1* | 1/2008 | Aittola | H04L 29/12188 726/3 |
| 2008/0263169 A1* | 10/2008 | Brabec | H04L 12/58 709/206 |
| 2009/0047967 A1* | 2/2009 | Zhu | H04L 51/14 455/445 |
| 2009/0067408 A1* | 3/2009 | Leppainen | H04L 65/1066 370/350 |
| 2009/0150562 A1* | 6/2009 | Kim | H04N 7/173 709/238 |
| 2009/0213761 A1* | 8/2009 | Lai | H04L 45/00 370/254 |
| 2010/0075673 A1* | 3/2010 | Colbert | H04L 12/589 455/435.1 |
| 2010/0081460 A1* | 4/2010 | Knight | H04L 12/6418 455/461 |
| 2010/0088371 A1* | 4/2010 | Xu | H04W 8/22 709/203 |
| 2010/0325249 A1* | 12/2010 | Brunson | H04L 29/12122 709/221 |
| 2012/0039312 A1* | 2/2012 | Narkar | H04W 8/00 370/338 |
| 2012/0136923 A1* | 5/2012 | Grube | G06Q 10/06315 709/203 |
| 2013/0091290 A1* | 4/2013 | Hirokawa | H04N 7/15 709/227 |
| 2013/0304913 A1* | 11/2013 | Boyer | H04L 51/04 709/224 |
| 2013/0339454 A1* | 12/2013 | Walker | H04L 51/04 709/206 |
| 2014/0095683 A1* | 4/2014 | Knowles | H04L 67/303 709/223 |
| 2014/0136333 A1* | 5/2014 | Shoshitaishvili | G06Q 30/0269 705/14.66 |
| 2014/0171135 A1* | 6/2014 | Fan | H04W 4/12 455/466 |
| 2014/0173002 A1* | 6/2014 | Frederick | H04W 12/06 709/206 |
| 2014/0272814 A1* | 9/2014 | Parent | G06F 3/0484 434/112 |
| 2014/0282041 A1* | 9/2014 | Walker | G06F 3/0484 715/739 |
| 2014/0335852 A1* | 11/2014 | Li | H04M 1/72597 455/426.1 |
| 2015/0043387 A1* | 2/2015 | Mandi | H04L 65/40 370/259 |
| 2015/0045074 A1* | 2/2015 | Wong | H04L 12/5895 455/466 |
| 2015/0181023 A1* | 6/2015 | Citron | H04M 3/42059 379/207.02 |
| 2015/0215251 A1* | 7/2015 | Parent | G09B 21/009 709/206 |
| 2015/0230065 A1* | 8/2015 | Zisimopoulos | H04W 4/005 455/414.1 |
| 2015/0256985 A1* | 9/2015 | Kornafeld | H04W 4/12 455/466 |
| 2015/0261809 A1* | 9/2015 | Xu | G06F 17/30371 707/690 |
| 2016/0006841 A1* | 1/2016 | Gurevich | G06F 21/30 709/203 |
| 2016/0050287 A1* | 2/2016 | Golub | H04L 67/22 709/217 |
| 2016/0127444 A1* | 5/2016 | Singh | G06F 17/30896 709/203 |
| 2016/0142346 A1* | 5/2016 | Orr | H04L 51/04 709/206 |
| 2016/0149966 A1* | 5/2016 | Remash | H04L 65/1096 370/351 |
| 2016/0156783 A1* | 6/2016 | Mufti | H04M 3/465 455/445 |
| 2016/0170991 A1* | 6/2016 | Birchall | G06F 17/3053 707/751 |
| 2016/0173631 A1* | 6/2016 | McKay | H04L 67/22 709/203 |
| 2016/0295390 A1* | 10/2016 | Gonzalez De Langarica | H04M 3/4931 |
| 2016/0315902 A1* | 10/2016 | Silva | H04L 67/306 |
| 2016/0344776 A1* | 11/2016 | Gonzalez De Langarica | H04L 65/1016 |
| 2016/0344866 A1* | 11/2016 | Lau | H04M 3/42263 |
| 2016/0345167 A1* | 11/2016 | Li | H04W 8/04 |
| 2017/0034675 A1* | 2/2017 | Kornafeld | H04W 4/14 |

* cited by examiner

PROVIDING A SERVICE TO A USER DEVICE BASED ON A CAPABILITY OF THE USER DEVICE WHEN THE USER DEVICE SHARES AN IDENTIFIER

BACKGROUND

An identifier, such as a device identifier, a subscriber identifier, or the like, may be shared by multiple user devices. For example, a first user device, such as a mobile phone, may share an identifier with a second user device, such as a tablet computer. In this way, a subscriber may use either device (e.g., the mobile phone or the tablet computer) in association with the subscriber's account.

DETAILED DESCRIPTION OF PREFERRED EMBODIMENTS

The following detailed description of example implementations refers to the accompanying drawings. The same reference numbers in different drawings may identify the same or similar elements.

Different user devices, that share an identifier (e.g., a device identifier, a subscriber identifier, etc.), may have different capabilities. For example, different user devices may be capable of supporting different services, such as voice services, video services, web services, television services, or services associated with a particular application. In this case, when a service provider device provides a service based on a shared identifier, the service provider device may not be able to identify a user device capable of supporting the service. Thus, the service provider device may provide the service to the wrong user device (e.g., a user device incapable of supporting the service). Implementations described herein assist in identifying a user device capable of supporting a service when the user device shares an identifier with other user devices.

Figure 1A:
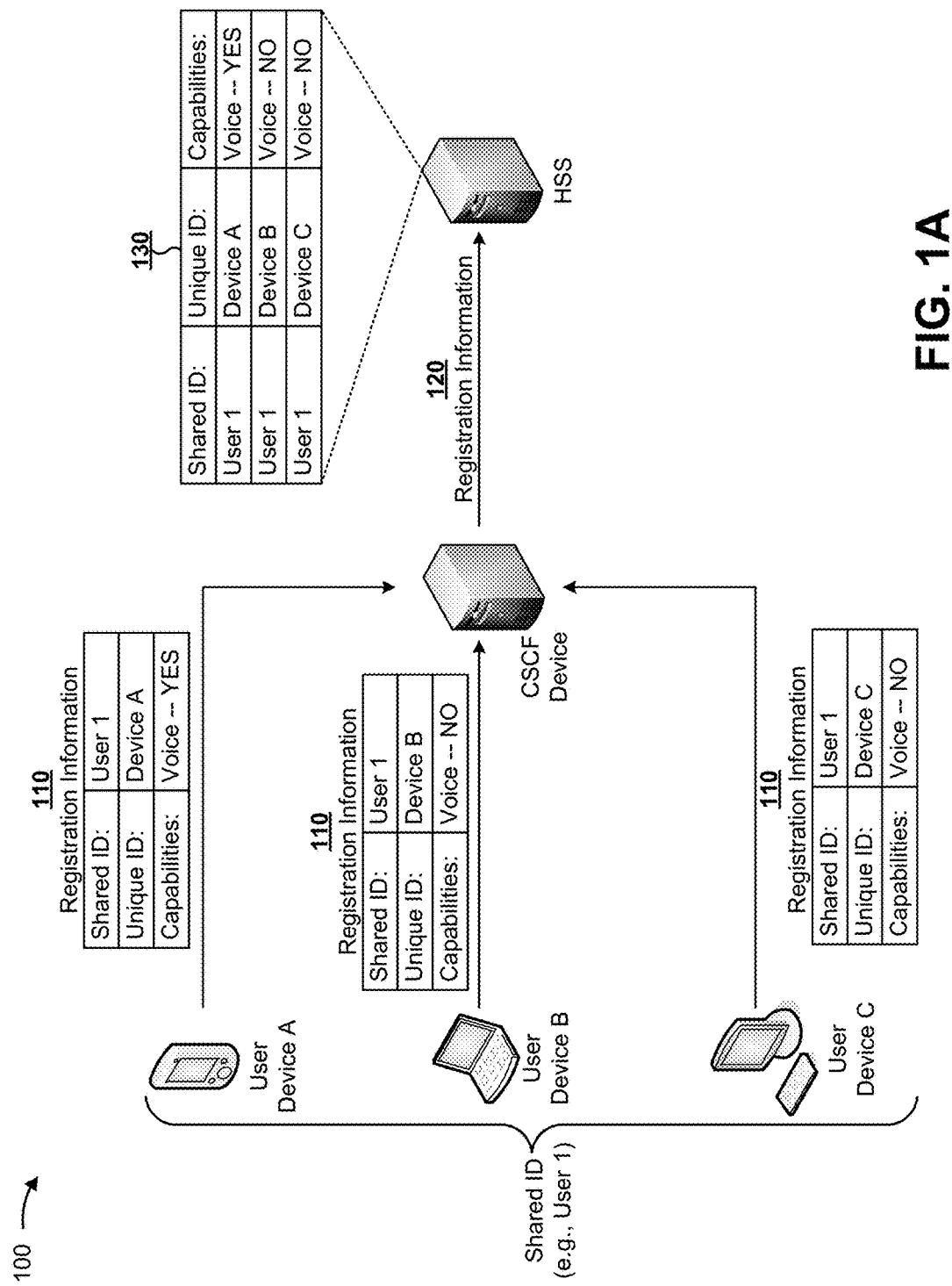
FIGS. 1A and 1B are diagrams of an overview of an example implementation described herein.
Figure 1B:
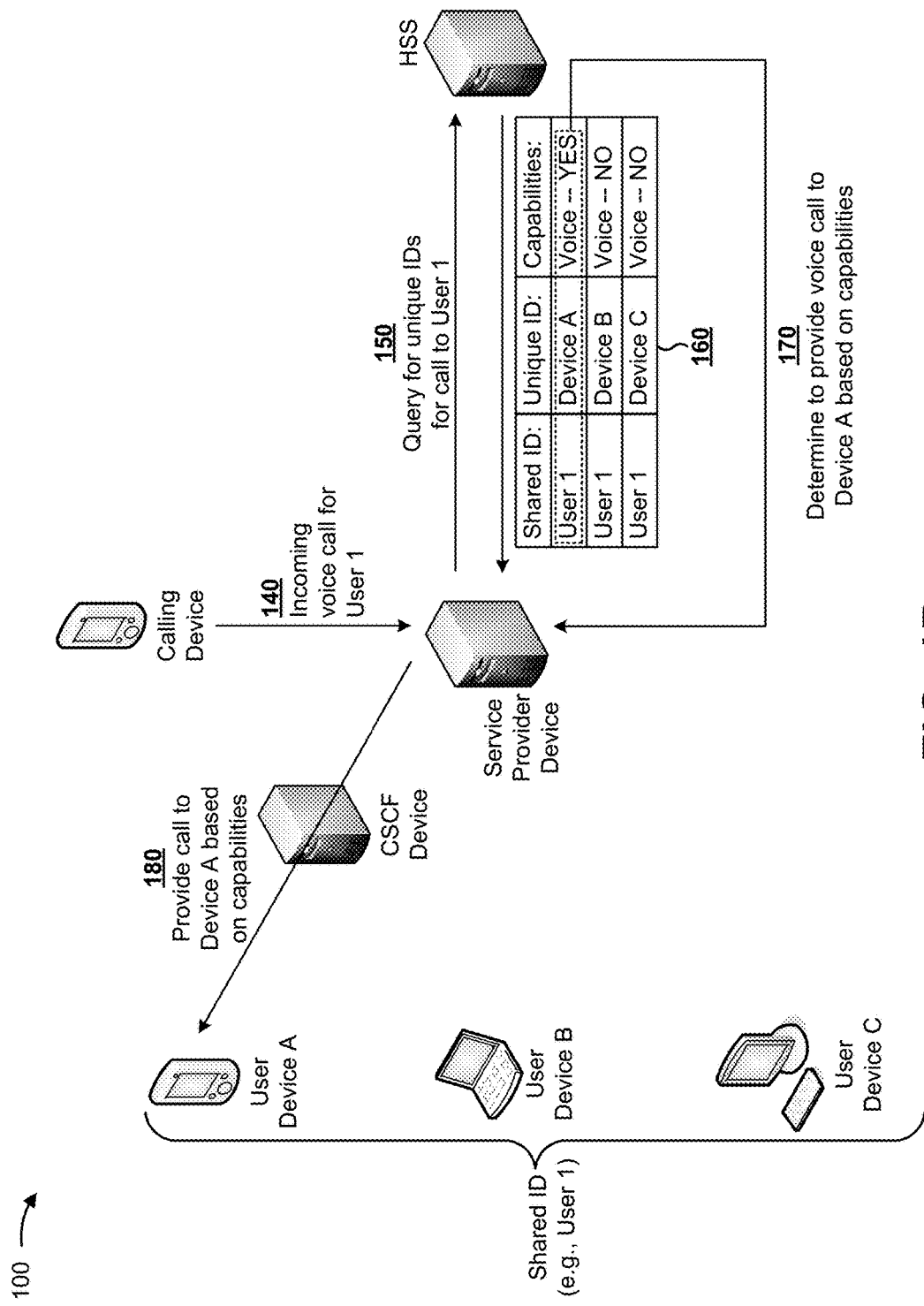

FIGS. 1A and 1B are diagrams of an overview of an example implementation 100 described herein. As shown in FIG. 1A, assume that three user devices, shown as User Device A, User Device B, and User Device C, all share an identifier, shown as User 1. For example, the three user devices may be registered to a subscriber account of User 1. As shown, when the user devices register with a network (e.g., by registering with a call session control function (CSCF) device and/or a home subscriber server (HSS)), the user devices may provide registration information. As shown by reference number 110, the registration information may identify the shared identifier associated with a user device, a unique identifier that uniquely identifies the user device, and one or more capabilities of the user device.

As an example, and as shown, the registration information for User Device A may identify the shared identifier of User 1, the unique identifier of Device A, and an indication that User Device A supports voice services (e.g., voice calls). As another example, the registration information for User Device B may identify the shared identifier of User 1, the unique identifier of Device B, and an indication that User Device B does not support voice services. Finally, the registration information for User Device C may identify the shared identifier of User 1, the unique identifier of Device C, and an indication that User Device C does not support voice services. As shown by reference number 120, the CSCF device may receive the registration information from User Device A, User Device B, and User Device C, and may provide the registration information to the HSS. As shown by reference number 130, the HSS may store the registration information.

As shown in FIG. 1B, and by reference number 140, assume that a calling device initiates a voice call associated with User 1. As shown, the calling device may provide a request for the voice call to a service provider device that provides voice services. Without using the registration information, the service provider device may not be able to determine whether to provide the voice call to User Device A, User Device B, or User Device C. In this case, the service provider device might provide the voice call to a user device incapable of receiving the voice call, such as User Device B or User Device C. However, as shown by reference number 150, the service provider device may query the HSS to determine unique identifiers associated with each of the user devices that share the shared identifier (e.g., User 1).

As shown by reference number 160, the HSS may provide the unique identifiers, associated with the shared identifier, to the service provider device. The HSS may also provide information that identifies a set of capabilities associated with each unique identifier. As shown by reference number 170, based on the unique identifiers and the capabilities, the service provider device may determine to provide the voice call to User Device A because User Device A is capable of receiving the voice call, and User Devices B and C are incapable of receiving the voice call. Thus, as shown by reference number 180, the service provider device may provide the voice call to User Device A.

In this way, the HSS assists the service provider device with identifying a user device capable of receiving a service, provided by the service provider device, based on capabilities of the user device when the user device shares an identifier with other user devices. Without this assistance, the service provider device may provide the service to one of the other user devices, which is incapable of receiving the service. Thus, implementations described herein increase the reliability of services provided via a network.

As indicated above, FIGS. 1A and 1B are provided as an example. Other examples are possible and may differ from what was described in connection with FIGS. 1A and 1B. For example, a different type of shared identifier may be used, a different type of unique identifier may be used, the user devices may have different types of capabilities, the service provider device may provide a different type of service, or the like, as described in more detail elsewhere herein.

Figure 2:
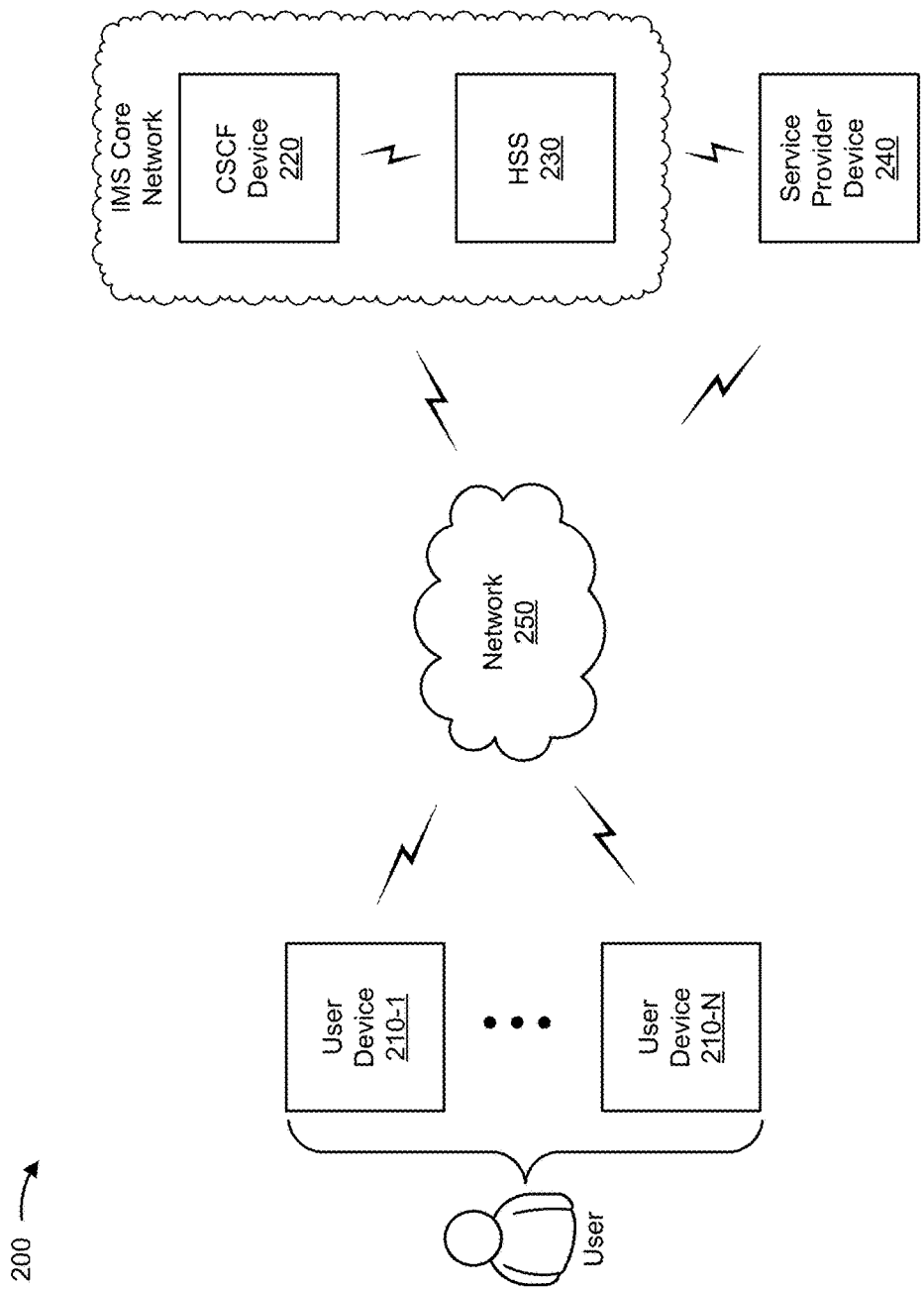
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more user devices 210-1 through 210-N (N≥1) (hereinafter referred to collectively as "user devices 210," and individually as user device 210"), a call session control function (CSCF) device 220, a home subscriber server (HSS) 230, a service provider device 240, and a network 250. Devices of environment 200 may interconnect via wired connections, wireless connections, or a combination of wired and wireless connections.

User device 210 may include one or more devices with one or more capabilities (e.g., capable of supporting a particular service, incapable of supporting a particular service, etc.). For example, user device 210 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, multiple user devices 210 may share an identifier (e.g., a shared identifier), such as an identifier associated with a user.

CSCF device 220 may include one or more devices capable of managing signal and control functions in a network, such as an Internet Protocol Multimedia Subsystem (IMS) core network. In some implementations, CSCF device 220 may be associated with and/or responsible for delivery of a service to user device 210. In some implementations, CSCF device 220 may be capable of receiving, determining, storing, generating, and/or providing information that causes user device 210 to register with the network (e.g., by registering with CSCF device 220 and/or HSS 230). CSCF device 220 is provided in environment 200 as an example. In some implementations, CSCF device 220 may be another type of service delivery device. HSS 230 may include one or more devices, such as one or more server devices, capable of managing subscription and/or other information associated with user device 210. In some implementations, HSS 230 may be capable of receiving, determining, storing, generating, and/or providing information that causes user device 210 to register with a network, such as an IMS core network (e.g., by registering with HSS 230). HSS 230 is provided in environment 200 as an example. In some implementations, HSS 230 may be another type of subscription information storage device, such as a home location register (HLR).

Service provider device 240 may include one or more devices capable of receiving, generating, storing, processing, and/or providing information associated with a service. For example, service provider device 240 may include a computing device, such as a server (e.g., an application server, a content server, a web server, a host server, a database server, a voice portal server, a payment processing server, a credit card processing server, a content delivery network server, a voice call server, a video call server, a gaming server, etc.), a security device (e.g., a firewall, a gateway, an access point, etc.), or a similar device. In some implementations, service provider device 240 may provide a service to user device 210 (e.g., via CSCF device 220).

Network 250 may include one or more wired and/or wireless networks. For example, network 250 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
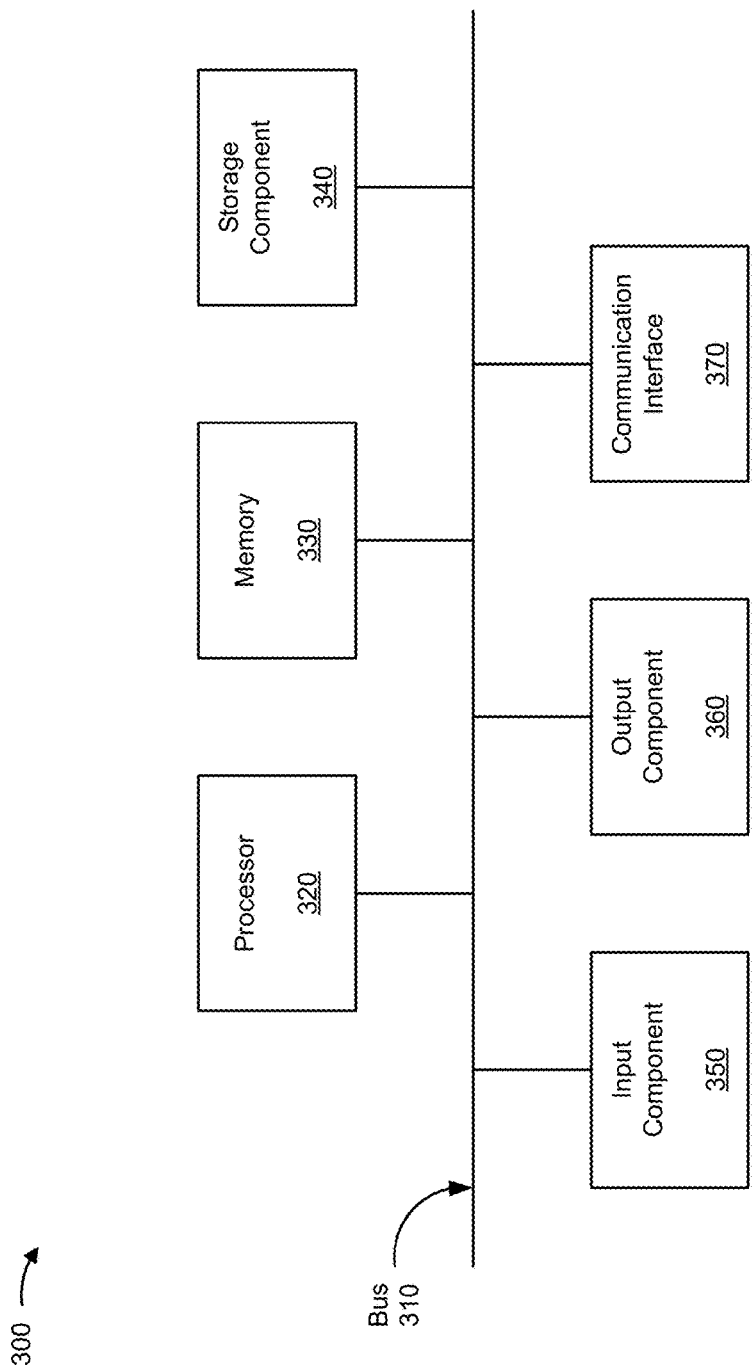
FIG. 3 is a diagram of example components of one or more devices of FIG. 2.

FIG. 3 is a diagram of example components of a device 300. Device 300 may correspond to user device 210, CSCF device 220, HSS 230, and/or service provider device 240. In some implementations, user device 210, CSCF device 220, HSS 230, and/or service provider device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
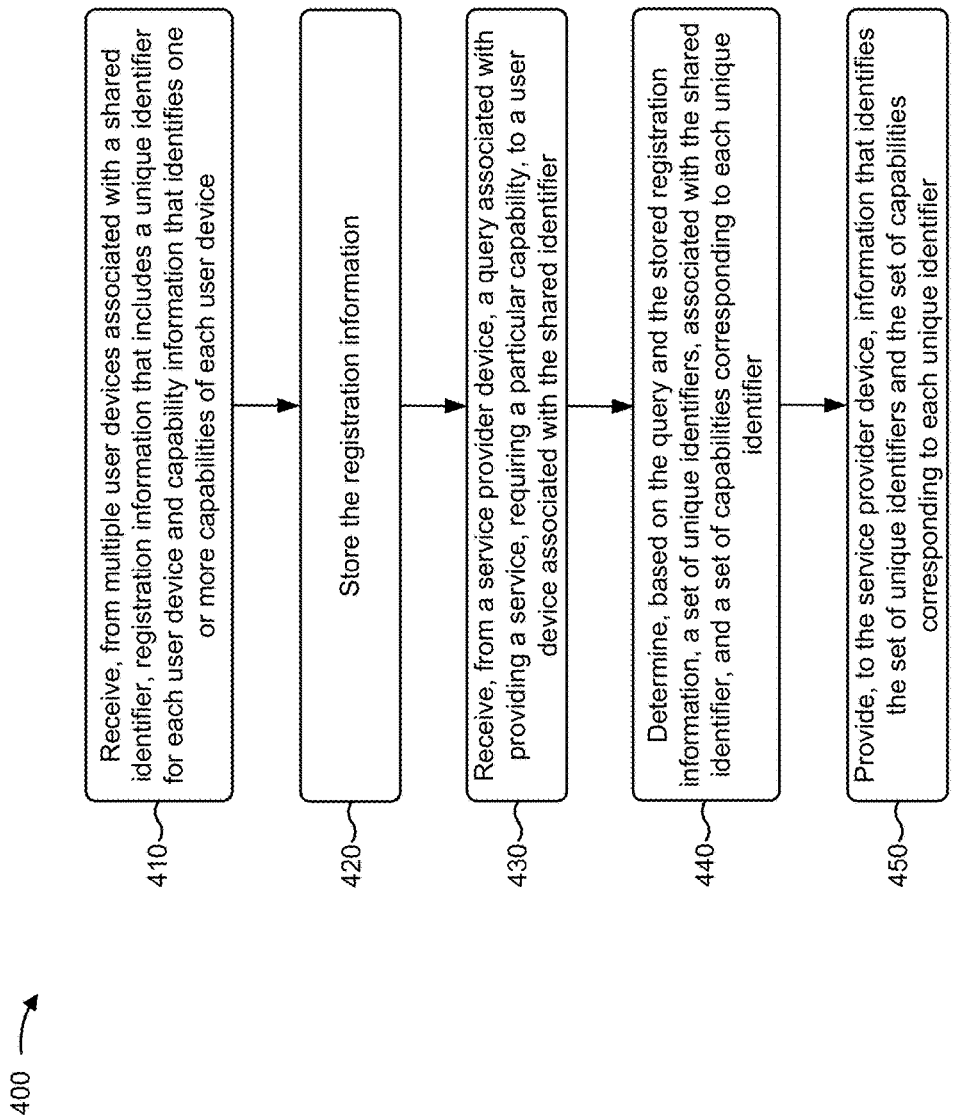
FIG. 4 is a flow chart of an example process for providing a service to a user device based on a capability of the user device when the user device shares an identifier with other user devices.

FIG. 4 is a flow chart of an example process 400 for providing a service to a user device based on a capability of the user device when the user device shares an identifier with other user devices. In some implementations, one or more process blocks of FIG. 4 may be performed by HSS 230. In some implementations, one or more process blocks of FIG. 4 may be performed by another device or a group of devices separate from or including HSS 230, such as user device 210, CSCF device 220, and/or service provider device 240.

As shown in FIG. 4, process 400 may include receiving, from multiple user devices associated with a shared identifier, registration information that includes a unique identifier for each user device and capability information that identifies one or more capabilities of each user device (block 410). For example, HSS 230 may receive registration information associated with multiple user devices 210 that share a shared identifier. In some implementations, the shared identifier may include a subscriber identifier that identifies a subscriber associated with the multiple user devices 210. For example, the shared identifier may include an account name, an email address, a telephone number (e.g., a mobile directory number (MDN)), a public user identity (PUID), an Internet Protocol (IP) multimedia private identity (IMPI), a username, or the like.

In some implementations, the registration information may include a unique identifier that uniquely identifies a particular user device 210. The unique identifier may differentiate a first user device 210 from a second user device 210 when the first user device 210 and the second user device 210 share the same shared identifier. For example, the unique identifier may include an instance identifier (e.g., a session initiation protocol (SIP) instance identifier), a media access control (MAC) address, an international mobile equipment identity (IMEI), or the like. In some implementations, HSS 230 may receive a unique identifier for each user device 210 that shares the shared identifier.

Additionally, or alternatively, the registration information may include capability information associated with user device 210. The capability information may identify one or more capabilities of user device 210. For example, a capability may indicate a type of service (e.g., a service type) that user device 210 is capable of supporting (e.g., a service that the user device is capable of correctly receiving, handling, managing, etc.). A type of service may be, for example, a voice call service, a video call service, a messaging service (e.g., a short message service (SMS), a multimedia messaging service (MMS), an instant messaging service, a chat service, etc.), an email service, a web browsing service, a gaming service, a television service, a streaming service, a music service, or another type of service. In some implementations, a type of service may be a type of service associated with a particular application, such as a voice call application, a video call application, a messaging application, an email application, a web browsing application, a gaming application, a television application, a streaming application, a music application, or another type of application. In this case, the capability may indicate whether user device 210 supports the application. In some implementations, HSS 230 may receive capability information for each user device 210 that shares the shared identifier.

Additionally, or alternatively, the registration information may indicate one or more user preferences, associated with one or more capabilities, for user device 210. For example, user device 210 may have a capability, but a user of user devices 210 may not want user device 210 to receive services that require the capability. In this case, the user may set a user preference (e.g., by interacting with user device 210), and user device 210 may provide information that identifies the user preference to HSS 230 (e.g., via CSCF device 220).

In some implementations, the user preference may indicate to permit a service to be received by user device 210. In some implementations, the user preference may indicate to prevent a service from being received by user device 210. In some implementations, the user preference may be explicitly included in the registration information. In some implementations, the user preference may be implicitly included in the registration information by indicating, using the capability information, that user device 210 does not have a particular capability (e.g., even if user device 210 does have the capability).

In some implementations, the registration information may be provided via a SIP registration request. Additionally, or alternatively, the registration information may include a network address (e.g., an IP address) associated with user device 210. In some implementations, user device 210 may provide the registration information to CSCF device 220, which may provide the registration information to HSS 230. For example, user device 210 may provide the registration information when registering with a network managed by CSCF device 220 and/or HSS 230.

In some implementations, HSS 230 may receive first registration information (e.g., a first portion of registration information) from a first user device 210 (e.g., via CSCF device 220), and may receive second registration information (e.g., a second portion of registration information) from a second user device 210 (e.g., via CSCF device 220). For example, when the first user device 210 registers with a network associated with CSCF device 220 and HSS 230, the first user device 210 may provide first registration information (e.g., that identifies a first user identifier and first capabilities) to HSS 230 via CSCF device 220. Similarly, when the second user device 210 registers with the network, the second user device 210 may provide second registration information (e.g., that identifies a second user identifier and second capabilities) to HSS 230 via CSCF device 220.

As further shown in FIG. 4, process 400 may include storing the registration information (block 420). For example, HSS 230 may receive the registration information (e.g., from user devices 210 via CSCF device 220), and may store the registration information. In some implementations, HSS 230 may store the registration information using a data structure. The data structure may indicate a relationship between a shared identifier of user device 210, a unique identifier of user device 210, and one or more capabilities supported by user device 210. HSS 230 may store the registration information upon registration of user device 210 with a network. HSS 230 may store the registration information so that service provider device 240 may correctly provide a service to user device 210 capable of receiving the service (e.g., when user device 210 shares a shared identifier with other user devices 210), as described below.

As further shown in FIG. 4, process 400 may include receiving, from a service provider device, a query associated with providing a service, requiring a particular capability, to a user device associated with the shared identifier (block 430). For example, HSS 230 may receive a query from service provider device 240 that provides a service requiring a capability. The service may be destined and/or intended for user device 210 that shares a shared identifier with other user devices 210. Additionally, or alternatively, the service may be associated with network traffic, deliverable by service provider device 240 and destined and/or intended for user device 210. In some implementations, the query may include the shared identifier, and HSS 230 may use the shared identifier to identify a set of unique identifiers associated with the shared identifier, as described below. In some implementations, the query may include a capability identifier that identifies a capability required by the service (e.g., a capability to support a particular type of service).

As further shown in FIG. 4, process 400 may include determining, based on the query and the stored registration information, a set of unique identifiers, associated with the shared identifier, and a set of capabilities corresponding to each unique identifier (block 440). For example, HSS 230 may determine, based on the query, a set of unique identifiers and a set of capabilities corresponding to the set of unique identifiers. In some implementations, HSS 230 may receive the shared identifier (e.g., included in the query), and may use the shared identifier to search a data structure that stores registration information. Based on searching the data structure, HSS 230 may identify a set of unique identifiers that identifies user device(s) 210 that share the shared identifier. Additionally, or alternatively, HSS 230 may identify a set of capabilities associated with user device(s) 210. The set of capabilities may correspond to the set of unique identifiers, such that one or more particular capabilities of user device 210 may be identified based on a particular unique identifier that identifies user device 210.

As further shown in FIG. 4, process 400 may include providing, to the service provider device, information that identifies the set of unique identifiers and the set of capabilities corresponding to each unique identifier (block 450). For example, HSS 230 may provide information that identifies the set of capabilities, and the corresponding set of unique identifiers, to service provider device 240 (e.g., via an Sh interface between HSS 230 and service provider device 240). Service provider device 240 may use this information to determine a unique identifier of a user device 210 that supports a capability required by a service provided by service provider device 240. In other words, service provider device 240 may determine a unique identifier of a user device 210 that supports the service.

In some implementations, service provider device 240 may use the information that identifies the set of capabilities to identify unique identifier(s) of user device(s) 210 that support the service. For example, if user device 210 supports the service (e.g., as indicated by the set of capabilities), then service provider device 240 may add user device 210 (e.g., a unique identifier of user device 210) to a list of potential user devices 210 to be provided with the service. Service provider device 240 may analyze each user device 210 (e.g., identified by a unique identifier) in this way, to generate a list of user devices 210 that support the service. If the list includes a single user device 210, then service provider device 240 may provide the service to the single user device 210. If the list includes multiple user devices 210, then service provider device 240 may provide the service to all of the multiple user devices 210, a subset of the multiple user devices 210, one of the multiple user devices 210 (e.g., determined based on a stored preference, determined randomly, etc.), or the like. In this way, service provider device 240 conserves processing resources and memory resources of HSS 230 (e.g., by performing the processing using service provider device 240).

Additionally, or alternatively, service provider device 240 may provide, in a query to HSS 230 (e.g., described above in connection with block 440), information that identifies a capability required by a service. In this case, HSS 230 may perform the analysis described above to identify a list of unique identifier(s) of user device(s) 210 that support the service. HSS 230 may provide the list of unique identifiers to service provider device 240, and service provider device 240 may provide the service to one or more user devices 210 identified by the list of unique identifiers (e.g., based on whether the list includes a single user device 210 or multiple user devices 210, as described above). In this way, HSS 230 conserves processing resources and memory resources of service provider device 240 (e.g., by performing the processing using HSS 230).

As an example, assume that the list of unique identifiers includes a first unique identifier that identifies a first user device 210 that supports a service provided by service provider device 240, a second unique identifier that identifies a second user device 210 that does not support the service, and a third unique identifier that identifies a third user device 210 that does not support the service (e.g., as described above in connection with FIGS. A and 1B). In this case, service provider device 240 may select the first unique identifier, and may use the first unique identifier to provide the service to the first user device 210 because the first user device 210 supports the service. In some implementations, HSS 230 may perform the selection for service provider device 240.

In this way, HSS 230 and/or service provider device 240 may improve the reliability with which services are delivered to user devices 210. For example, HSS 230 and/or service provider device 240 may prevent a service from being delivered to a user device 210 that is incapable of supporting that service. In this way, HSS 230 and/or service provider device 240 conserve network resources by preventing wasted communications.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
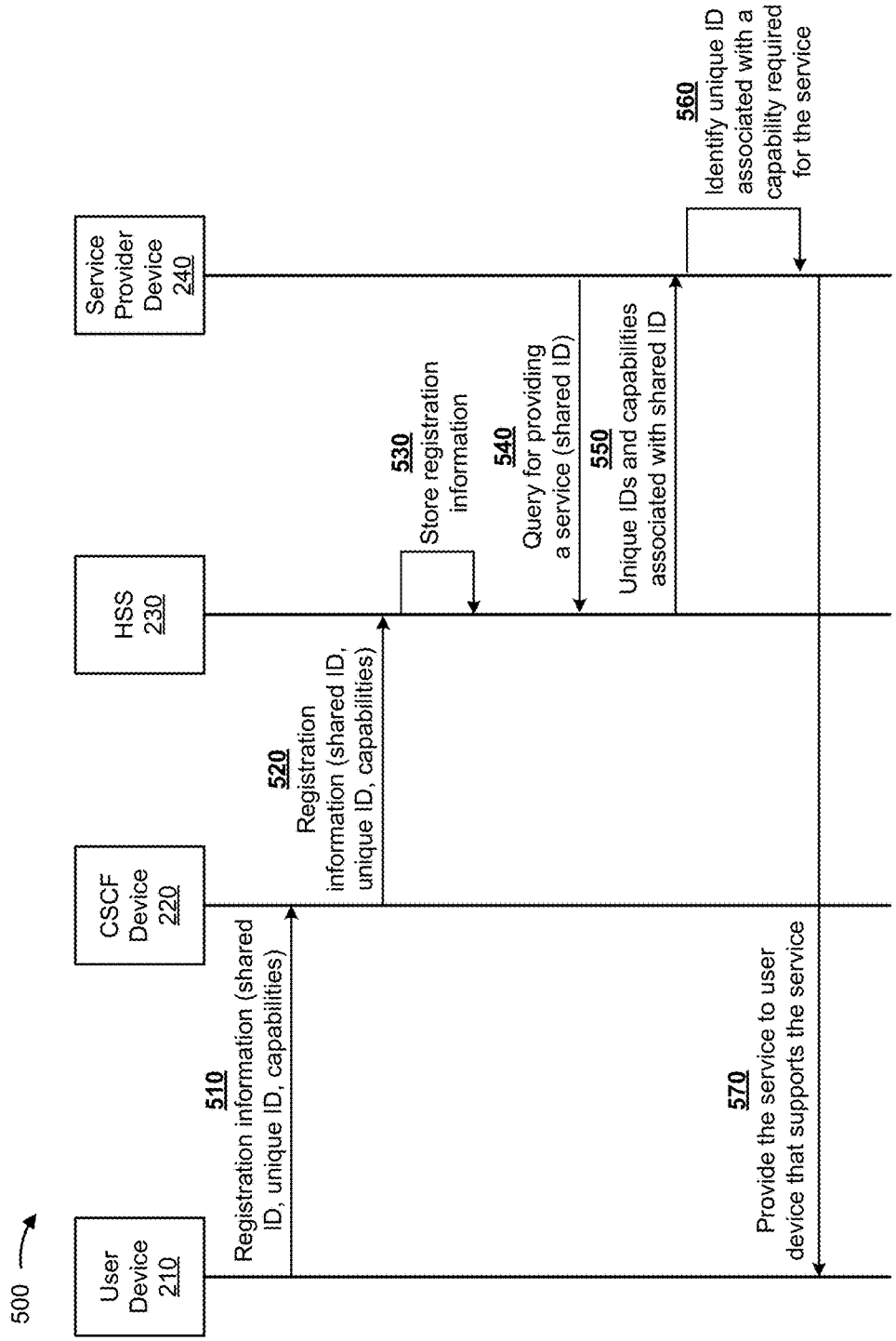
FIG. 5 is a call flow diagram of an example call flow 500 for providing a service to a user device based on a capability of the user device when the user device shares an identifier with other user devices.

FIG. 5 is a call flow diagram of an example call flow 500 for providing a service to a user device, based on a capability of the user device, when the user device shares an identifier with other user devices As shown in FIG. 5, and by reference number 510, user device 210 may provide registration information to CSCF device 220. For example, the registration information may include a shared identifier associated with user device 210, a unique identifier associated with user device 210, and information that identifies one or more capabilities associated with user device 210. As shown by reference number 520, CSCF device 220 may provide the registration information to HSS 230. As shown by reference number 530, HSS 230 may store the registration information.

As shown by reference number 540, HSS 230 may receive, from service provider device 240, a query associated with providing a service to a user device 210 associated with a shared identifier. For example, the query may include the shared identifier. As shown by reference number 550, HSS 230 may provide, to service provider device 240, information that identifies the unique identifiers, associated with the shared identifier, and the corresponding capabilities associated with the unique identifiers. For example, HSS 230 may determine this information based on the stored registration information.

As shown by reference number 560, service provider device 240 may identify a unique identifier associated with a capability required for the service. As shown by reference number 570, based on identifying the unique identifier, service provider device 240 may provide the service to the user device 210 that supports the service (e.g., based on the capabilities associated with a unique identifier of the user device 210). In this way, service provider device 240 may identify, from a group of user devices 210 that share a shared identifier, one or more user devices 210 that support a service that service provider device 240 provides. This avoids wasting resources associated with providing a service to user devices 210 that do not support the service.

As indicated above, FIG. 5 is provided as an example. Other examples are possible and may differ from what was described in connection with FIG. 5.

Implementations described herein assist in identifying a user device capable of supporting a service when the user device shares an identifier with other user devices. This improves the reliability of service delivery, and conserves network resources that would otherwise be wasted by delivering services to user devices incapable of supporting the services.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network device, comprising:
one or more memory devices; and
one or more processors, communicatively coupled to the one or more memory devices, to:
receive, from a plurality of user devices associated with a shared identifier and via a call session control function (CSCF), registration information that includes:
a unique identifier for each user device included in the plurality of user devices, and
capability information that identifies one or more capabilities of each user device included in the plurality of user devices,
the shared identifier including a subscriber identifier that identifies a subscriber account associated with the plurality of user devices;
store the registration information in a data structure of the network device;
receive, from a service provider device, a query associated with providing a service, requiring a particular capability that the service provider device provides, to at least one of the plurality of user devices associated with the shared identifier,
the query including the shared identifier, the query being received from the service provider device based on the service provider device receiving an incoming communication from another user device,
the other user device being different from the plurality of user devices,
the service being associated with a particular application, and
where the particular capability indicates whether a particular user device of the plurality of user devices supports the particular application;
determine, based on the query and the stored registration information, a set of unique identifiers associated with the shared identifier,
the network device using the shared identifier to search the data structure that stores the registration information;
determine a set of capabilities corresponding to each unique identifier included in the set of unique identifiers,
a first capability, of the set of capabilities, indicating a first user preference regarding whether to permit a first user device, of the plurality of user devices, to receive the service or to prevent the first user device, of the plurality of user devices, from receiving the service, and
a second capability, of the set of capabilities, indicating a second user preference regarding whether to permit a second user device, of the plurality of user devices, to receive the service or to prevent the second user device, of the plurality of user devices, from receiving the service; and
provide, to the service provider device, information that identifies the set of unique identifiers and the set of capabilities corresponding to each unique identifier included in the set of unique identifiers,
the information causing the service provider device, based upon an additional user preference, to deliver the service to at least one of:
a user device, of the plurality of user devices, that supports the service,
all user devices, of the plurality of user devices, that support the service, or
a subset of user devices, of the plurality of user devices, that support the service,
the additional user preference being identified based on an input provided by a user and stored by the service provider device.

2. The network device of claim 1, where the first capability, of the set of capabilities, indicates whether the first user device, associated with the first capability and identified by a particular unique identifier of the set of unique identifiers, supports the service.

3. The network device of claim 1, where the one or more processors, when receiving the registration information, are to:
receive a portion of the registration information, associated with the first user device of the plurality of user devices, when the first user device registers with a network associated with the network device.

4. The network device of claim 1, where the set of unique identifiers differentiate each user device, included in the plurality of user devices, from other user devices included in the plurality of user devices.

5. The network device of claim 1, where the additional user preference is explicitly included in the registration information.

6. The network device of claim 1, where the registration information is provided via a SIP registration request.

7. The network device of claim 1, where the unique identifier includes at least one of:
an instance identifier,
a media access control (MAC) address, or
an international mobile equipment identifier.

8. Then network device of claim 1, where the one or more processors, when providing, to the service provider device, the information that identifies the set of unique identifiers and the set of capabilities, are further to:
provide, to the service provider device, the information that identifies the set of unique identifiers and the set of capabilities via SH interface.

9. The network device of claim 1, where the network device is a home subscriber server (HSS).

10. A computer-readable medium storing instructions, the instructions comprising:
one or more instructions that, when executed by one or more processors, cause the one or more processors to:
receive, from a first user device associated with a shared identifier and via a call session control function (CSCF), first registration information that includes:
a first unique identifier that identifies the first user device, and
first capability information that identifies a first capability of the first user device;
receive, from a second user device associated with the shared identifier and via the CSCF, second registration information that includes:
a second unique identifier that identifies the second user device,
second capability information that identifies a second capability of the second user device, and
the shared identifier including a subscriber identifier that identifies a subscriber account associated with the first user device and the second user device;
store the first registration information and the second registration information in a data structure of a network device;
receive, from a service provider device, a query associated with providing a service, requiring a particular capability that the service provider device provides, to a particular user device associated with the shared identifier,
the query including the shared identifier,
the query being received from the service provider device based on the service provider device receiving an incoming communication from another user device,
the other user device being different from the first user device and the second user device,
the service being associated with a particular application,
the first capability indicating whether the first user device supports the particular application via which the service is provided;
identify, based on the shared identifier included in the query, the first unique identifier and the second unique identifier,
the network device using the shared identifier to search the data structure that stores the first registration information and the second registration information;

provide, to the service provider device and based on identifying the first unique identifier and the second unique identifier, information that identifies:
    the first unique identifier and the first capability corresponding to the first unique identifier, or
    the second unique identifier and the second capability corresponding to the second unique identifier, and
    the information causing the service provider device, based upon an additional user preference, to deliver the service to a user device that supports the service,
        the additional user preference being identified based on an input provided by a user and stored by the service provider device,
    where the first capability indicates a first user preference regarding whether to permit the first user device to receive the service or to prevent the first user device from receiving the service; and
    where the second capability indicates a second user preference regarding whether to permit the second user device to receive the service or to prevent the second user device from receiving the service.

11. The computer-readable medium of claim 10, where the one or more instructions, that cause the one or more processors to receive the first registration information, cause the one or more processors to:
    receive the first registration information when the first user device registers with a network; and
    where the one or more instructions, that cause the one or more processors to receive the second registration information, cause the one or more processors to:
        receive the second registration information when the second user device registers with the network.

12. The computer-readable medium of claim 10, where the additional user preference is explicitly included in the at least one of the first registration information or second registration information.

13. A method, comprising:
    receiving, via a call session control function (CSCF) and by a network device, registration information that identifies:
        a plurality of unique identifiers corresponding to a plurality of user devices that share a shared identifier,
            the shared identifier including a subscriber identifier that identifies a subscriber account associated with the plurality of user devices, and
        at least one capability of each user device included in the plurality of user device;
    receiving, by the network device and from a service provider device, a query associated with providing a service, requiring a particular capability that the service provider device provides, to at least one of the plurality of user devices that share the shared identifier,
        the query including the shared identifier,
            the query being received from the service provider device based on the service provider device receiving an incoming communication from another user device,
            the other user device being different from the plurality of user devices,
        the service being associated with a particular application, and
        where the at least one capability indicates whether a particular user device supports the particular application;
    identifying, by the network device and using the shared identifier included in the query, the plurality of unique identifiers,
        the network device using the shared identifier to search a data structure of the network device that stores the registration information;
    identifying, by the network device and using the registration information, a plurality of capabilities corresponding to the plurality of unique identifiers,
        a first capability indicating a first user preference regarding whether to permit a first user device to receive the service or to prevent the first user device from receiving the service; and
        a second capability indicating a second user preference regarding whether to permit a second user device to receive the service or to prevent the second user device from receiving the service; and
    providing, by the network device and to the service provider device, information that identifies at least one of the plurality of unique identifiers and at least one of the plurality of capabilities,
        the providing permitting the service provider device to deliver the service, based upon an additional user preference, to at least one of:
            a user device, of the plurality of user devices, that has the particular capability required by the service,
            all user devices, of the plurality of user devices, that support the service, or
            a subset of user devices, of the plurality of user devices, that support the service,
        the additional user preference being identified based on an input provided by a user and stored by the service provider device.

14. The method of claim 13, where the plurality of capabilities indicates whether each user device, included in the plurality of user devices, has the particular capability.

15. The method of claim 13, where the plurality of capabilities indicates whether each user device, included in the plurality of user devices, supports a service type associated with the service.

16. The method of claim 13, where the plurality of capabilities indicates whether each user device, included in the plurality of user devices, supports the particular application via which the service is provided.

17. The method of claim 13, where the plurality of unique identifiers differentiate each user device, included in the plurality of user devices, from other user devices included in the plurality of user devices.

18. The method of claim 13, where the additional user preference is explicitly included in the registration information.

19. The method of claim 13, where the plurality of unique identifiers includes at least one of:
    an instance identifier,
    a media access control (MAC) address, or
    an international mobile equipment identifier.

20. The method of claim 13, where the network device is a home subscriber server (HSS).

* * * * *